United States Patent [19]

Holtan

[11] 3,752,014
[45] Aug. 14, 1973

[54] CHAIN TRANSFER CASE WITH ACCESSORY TRANSMISSIONS

[76] Inventor: Maurice O. Holtan, 2012 Menomonee River Pky., Wauwatosa, Wis. 53226

[22] Filed: Jan. 8, 1971

[21] Appl. No.: 104,895

[52] U.S. Cl................. 74/745, 74/15.4, 74/216.5, 74/333
[51] Int. Cl............................................. F16h 3/02
[58] Field of Search................. 74/216.5, 217, 15.4, 74/333, 745

[56] References Cited
UNITED STATES PATENTS

| | | | |
|---|---|---|---|
| 1,570,925 | 1/1926 | Schmidt | 74/15.4 |
| 1,644,765 | 10/1927 | Wilson | 74/15.4 |
| 1,691,346 | 11/1928 | Gorbutt | 74/15.4 |
| 1,775,611 | 9/1930 | White | 74/15.4 |
| 1,860,246 | 5/1932 | Horste | 74/15.4 |
| 1,971,166 | 8/1934 | Read | 74/15.4 |
| 2,537,120 | 1/1951 | Collis | 74/216.5 |
| 2,783,654 | 3/1954 | Carnell | 74/216.5 |
| 3,029,654 | 4/1962 | Hill | 74/216.5 |
| 3,091,975 | 6/1963 | Davis | 74/15.4 |
| 3,360,998 | 1/1968 | Griffel | 74/216.5 |
| 3,605,523 | 9/1971 | O'Brien | 74/711 |

*Primary Examiner*—C. J. Husar
*Attorney*—Wheeler, House & Wheeler

[57] ABSTRACT

A chain drive transfer case is adapted for optional use with various accessory transmissions or rate changers which are interchangeably attached to one side of the chain case. The chain case includes an input shaft which has a splined end projecting through an opening in the case for coupling with the input shaft of any of the accessory transmissions or for use with an engagement or neutral lockout attachment. Each of the accessory transmissions has a tubular output shaft which is concentric with the chain case input shaft and which extends through said opening in the chain case to drivingly engage a chain sprocket which is supported on the chain case input shaft.

20 Claims, 10 Drawing Figures

Inventor
Maurice O. Holtan
By Whelan, House & Whelan
Attorneys

Patented Aug. 14, 1973
3,752,014
4 Sheets-Sheet 2
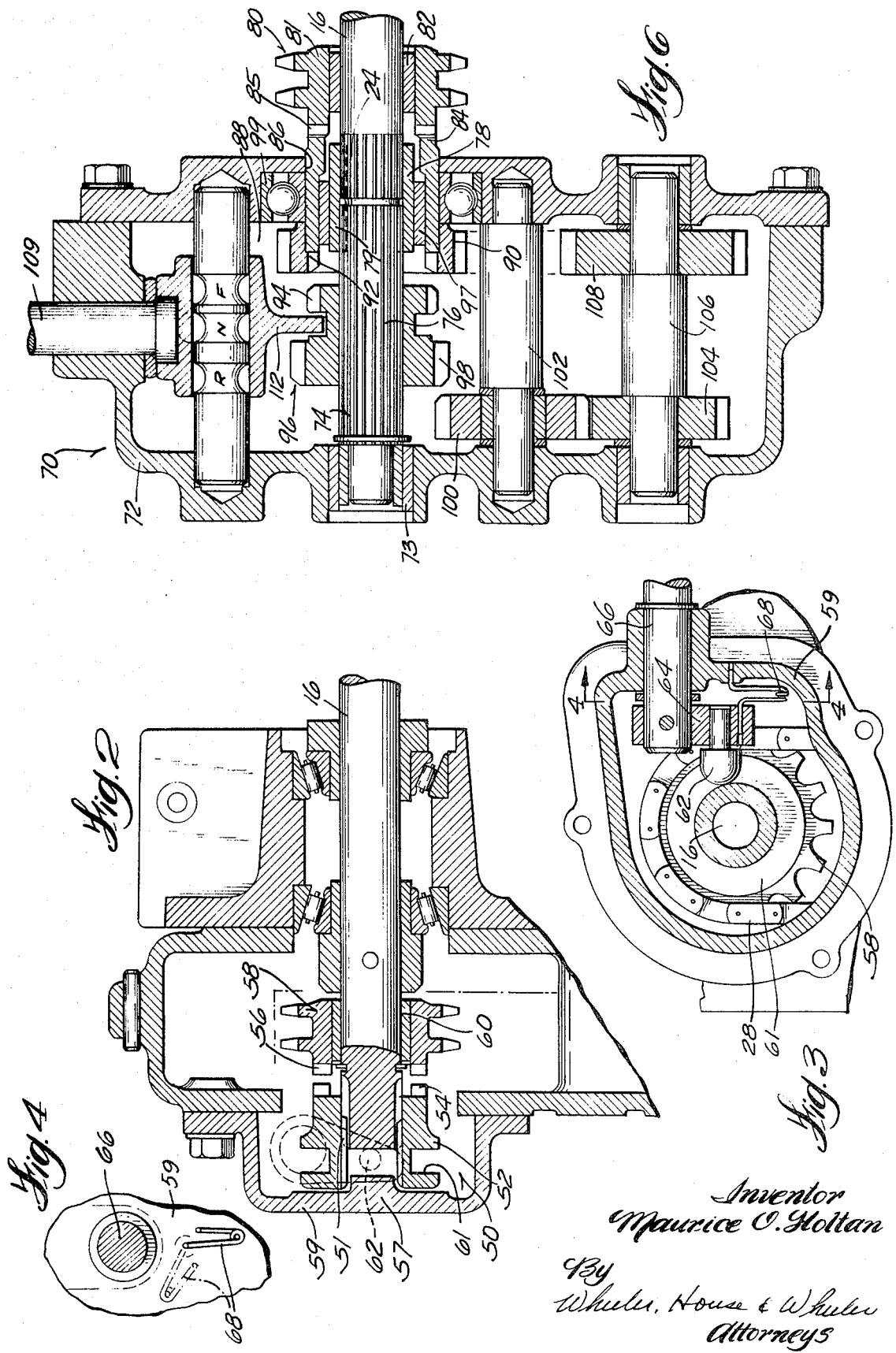

Patented Aug. 14, 1973  3,752,014

Inventor
Maurice C. Holtan

By
Wheeler, House & Wheeler
Attorneys

CHAIN TRANSFER CASE WITH ACCESSORY TRANSMISSIONS

BACKGROUND OF INVENTION

The invention relates particularly (but not solely) to drive trains for snowmobiles or other recreational vehicles. Heretofore, choice between a number of different drive trains has been necessary to provide purchasers with the desired performance. If the purchaser wished at a later date to add a rate changer or a rate changer with additional features, substantial alterations and substitutions of drive train components have been required.

SUMMARY OF INVENTION

To my chain transfer case can be interchangeably connected various transmission units which include rate changers and an engage or neutral lockout attachment to provide purchasers a choice of transmissions with various features. The chain case of my invention can be factory or dealer installed and the chosen rate changer easily installed at the time of purchase or at a later date without any substantial alterations to the drive train. The expense of substituting one rate changer for another is kept to a minimum by the use of common components.

The adaptability of the chain case to interchangeably receive the various rate changers primarily depends on the use of a chain sprocket coaxial with the input shaft and preferably supported on the chain case input shaft for independent rotation. The chain case input shaft and the chain sprocket are both accessible through a single opening in the chain case initially covered by a removable closure. The rate changers of the invention have concentric input and output shafts and are easily co-axially coupled with the chain case input shaft and chain sprocket hub through said chain case opening. Thus, the power flow from the chain case to the rate changer and the power output from the rate changer to the chain case goes through a common opening in the chain case so that the various rate changers are easily incorporated in a snowmobile or other vehicle without rebuilding or altering the original belt and chain drive.

Further objects and advantages of the present invention will become apparent from the following disclosure.

DRAWINGS

FIG. 2 is a fragmentary sectional view of the chain case shown in FIG. 1 and showing it equipped with an accessory engage, or disengage lockout attachment.

FIG. 3 is an end view in section of the lockout attachment shown in FIG. 2.

FIG. 4 is a sectional view along line 4—4 of FIG. 3.

FIG. 6 is a developed sectional view along line 6—6 of FIG. 10 of an accessory rate changer for the chain transfer case with forward, neutral and reverse operational modes.

DESCRIPTION

Figure 1:
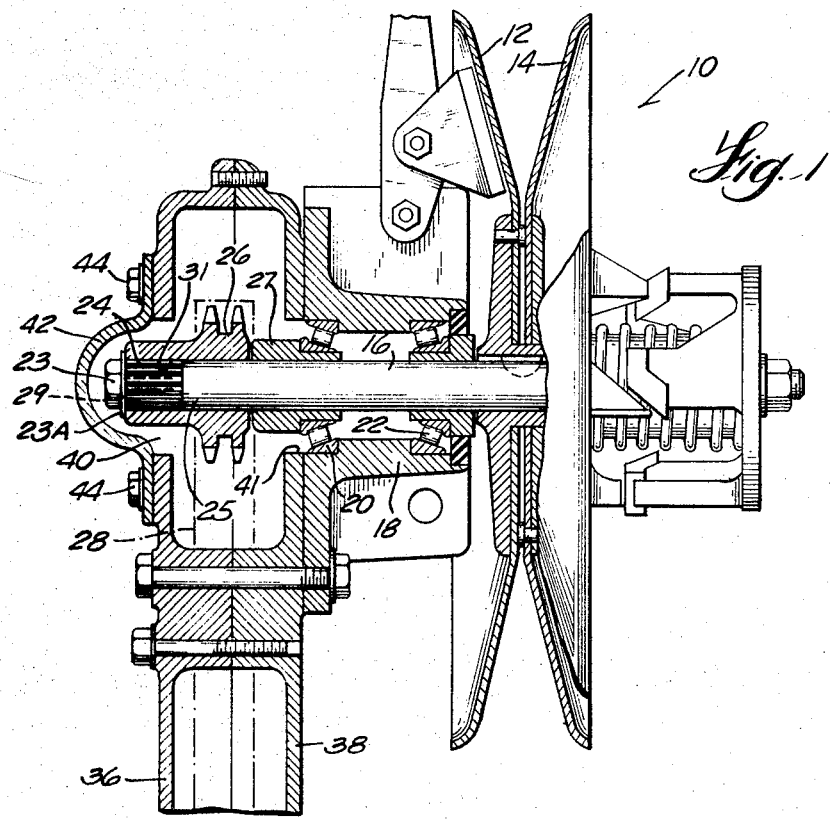
FIG. 1 is a sectional view of a portion of a vehicle drive train including the chain transfer case, input shaft and a supplementary housing in accordance with the invention.
Figure 5:
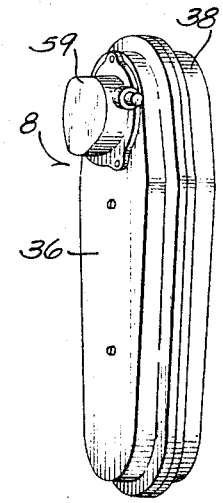
FIG. 5 is a perspective view of a supplementary attachment housing as it appears on the chain case as shown in FIG. 2.

FIG. 1 shows the chain case 8 of the invention as employed with parts of a conventional vehicle drive train for snowmobiles, all terrain vehicles, or other small recreational vehicles. The assembly includes a conventional split pulley rate changer 10 having flanges 12 and 14 which are biased toward each other but which separate under load to reduce the effective radius of the pulley 10 and change the drive ratio.

The pulley 10 is connected to an engine or other prime mover (not shown). The pulley 10 is supported on a chain case input or drive shaft 16 which is rotatably supported in a bearing block 18 by bearings 20 and 22. The bearing block 18 is intended to be mounted on the vehicle frame or chassis (not shown). The free outer end 25 of the input shaft 16 has an external spline 24 which interfits with an internal spline in the hub 31 of a chain sprocket 26. The sprocket 26 is held against an abutment 27 by a bolt 23 and washer 23A with the bolt 23 threaded into an axial aperture 29 in the input shaft 16.

The sprocket 26 drives on or more chains 28 which are arranged around a sprocket 30 fixed to an output shaft 32 intended to drive the ground engaging tread of a snowmobile or the wheels of a vehicle (not shown).

The chain case or housing 8 preferably has two sections 36 and 38 which are secured together by various bolts 39. The sections 36 and 38 are respectively provided with apertures 40 and 41 through which passes the input shaft 16. The input shaft 16 enters through the aperture 41 and the splined end 25 projects through aperture 40 and is enclosed by a cover or supplementary housing 42 secured to the chain case section 36 by bolts 44. The assembly shown in FIG. 1 is a complete basic drive unit as it stands.

ENGAGE OR NEUTRAL LOCKOUT ATTACHMENT

Various accessory transmissions units can be connected to the chain case 8 and chain case input shaft 16 to afford optional drive modes, including forward, neutral and reverse and multiple forward speeds with different drive ratios. FIGS. 2, 3, 4 and 5 show one such accessory transmission unit in the form of a rate changer accessory, specifically on engage-or-neutral lock-out attachment 50. The unit 50 includes a clutch dog or clutch member 52 which has an internal spline 51 which interfits with the spline 24 on shaft 16 and axial teeth 54 which engage axial teeth or projections 56 on the hub of a chain sprocket 58 which has been substituted for sprocket 26 and is freely rotatably supported on a sleeve bearing 60 on the shaft 16. The clutch dog 52 is positioned in part by a boss 57 on a supplementary housing 59.

Means are provided for selectively engaging and disengaging the clutch member 52 with the chain sprocket 58. As disclosed, the means include an annular groove 61 (FIG. 2) on the clutch member 52. The groove 61 receives a camming member 62 (FIG. 3) supported on a rocker arm 64 which is fixed to a rock shaft 66. A spring 68 having one leg anchored in the lever 64 and the other leg anchored in the supplementary housing 59 shifts over center to maintain the clutch member 52 in either extreme engaged or disengaged position.

RATE CHANGER WITH FORWARD, NEUTRAL AND REVERSE MODES

FIG. 6 discloses an accessory transmission unit or rate changer 70 which includes a supplementary housing 72 with bearings 73 which rotatably support a rate changer input extension shaft 74 which is coaxial with the chain case input shaft 16. The external spline 76 of the input shaft 74 is coupled to the end 24 of the chain case drive shaft 16 by a coupling 78 having an internal spline 79.

The accessory transmission 70 includes a tubular output shaft or sleeve shaft 84 which is coaxial with extension shaft 74 and projects back through the opening 86 in the housing 72. This opening is in registry with the opening 40 in the chain case 8. The output shaft 84 has teeth 85 which drivingly engage the hub 81 of a chain sprocket 80 which is freely rotatably supported on shaft 16 by a bearing 82. The output shaft 84 includes gear teeth 90 and clutch teeth 92 which are engageable with clutch teeth 94 on the hub of a gear 96 which is splined to the input shaft 74. The tubular output shaft 84 is supported by a bushing 97 located between the inside surface of output shaft 84 and the coupling 78. A bearing 99 supports the output shaft 84 in the housing 72.

When the transmission 70 is in the reverse mode, as hereinafter described in detail, reverse rotation of the chain sprocket 80 is afforded by the gear 96 which includes gear teeth 98 which mesh with an idler gear 100 carried on idler shaft 102. The gear 100 meshes with a gear 104 which is fixed to a shaft 106. The output shaft is driven by a gear 108 on shaft 106 which meshes with the teeth 90 on the output shaft 84.

Means are provided for shifting the gear 96 axially of the shaft 74 for the forward, neutral and reverse modes of operation. The means for shifting gear 96 are more fully described in my copending application Ser. No. 825,009 and include a rock shaft 109 and a shifting fork 112. FIG. 6 shows the gear 96 in a neutral position with no power transfer from the shaft 16 to the sprocket 80. Movement of the rock shaft 109 and the fork 112 to effect axial movement of the clutch teeth 94 into engagement with clutch teeth 92 on the output shaft 84, effects direct drive from shaft 16 through the hub of gear 96 to the tubular output shaft 84, and thus to the sprocket 80. Movement of the gear 96 to the left of the position shown in FIG. 6, causes engagement of the teeth 98 with gear 100 to counter-rotate the chain sprocket 80 by driving through reverse gear 100 and jack shaft gears 104 and 108 to sleeve shaft 84.

RATE CHANGER WITH TWO FORWARD SPEEDS

Figure 8:
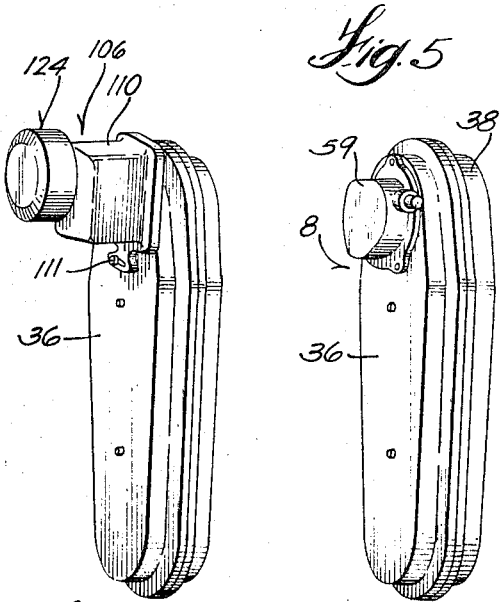
FIG. 8 is a perspective view of the chain case shown in FIG. 1 and the accessory rate changer shown in FIG. 7.
Figure 7:
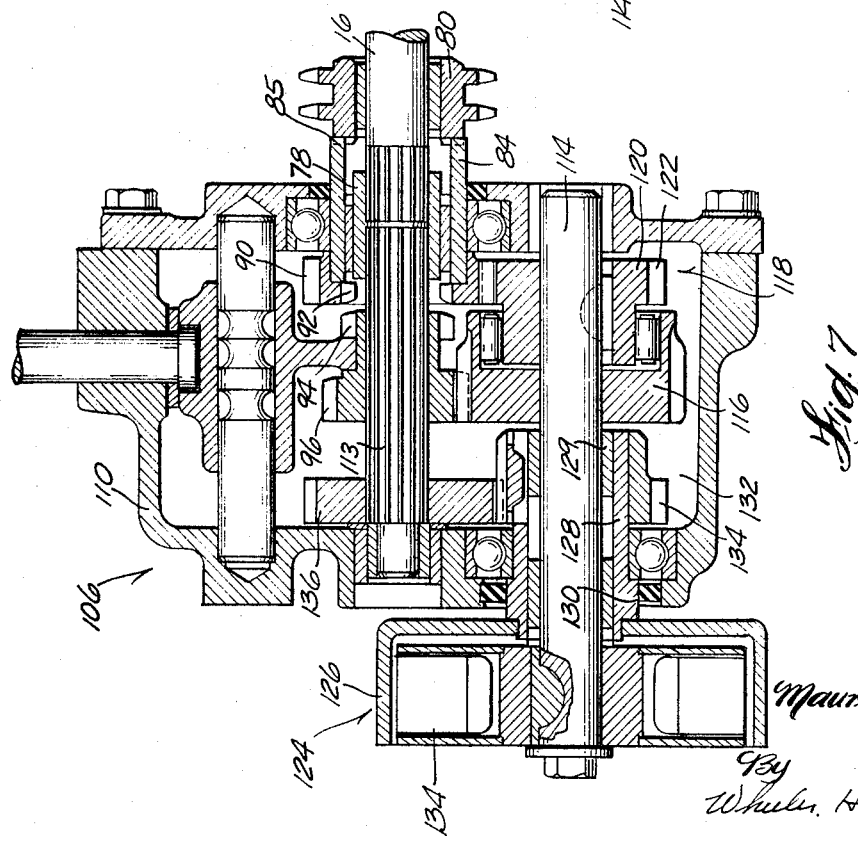
FIG. 7 is a developed sectional view of an accessory rate changer having two forward speeds with a centrifugal clutch for shifting between the forward speeds and a neutral mode.
Figure 10:
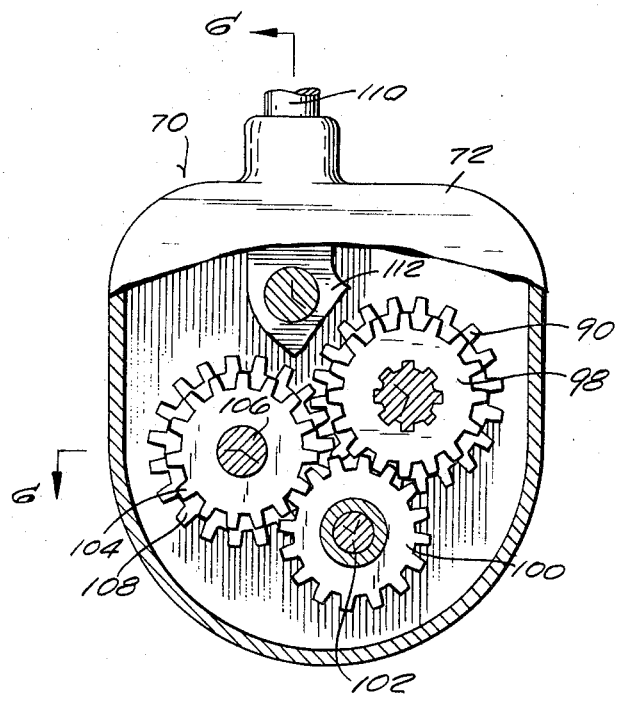
FIG. 10 is an end view with parts broken away and in fragmentary section of the rate changer shown in FIG. 6.

FIG. 7 shows a further accessory transmission unit or rate changer 106, which includes a supplementary housing 110 which is readily attached to the chain case 8 by bolts 111 (FIG. 8). The transmission unit 106 uses some of the components employed in the chain case and rate changer 70 shown in FIG. 6 including the sprocket 80, the output shaft 84, the input shaft 16, the gear 96 and the shifting mechanism. The rate changer 106 includes a rate changer input shaft 113 which is coupled to the chain case shaft 16 by the splined coupling 78. A jack shaft 114 rotatably supports the input element 116 of an overrunning or sprag clutch 118. The output element 120 of the clutch 118 is keyed to the shaft 114 and has teeth 122 which engage the teeth 90 on the output sleeve shaft 84.

The rate changer 106 in this embodiment also includes a centrifugal clutch 124 which has a drum 126 fixed to a sleeve shaft 128 which projects through an aperture 130 into the interior 132 of the housing 110, and is supported for rotation relative to the shaft 114 by bushings 129 and a bearing 131. The sleeve shaft 128 includes teeth 134 which are in mesh with a gear 136 fixed to the shaft 113.

Conventionally the drive to such a clutch goes to the shoes rather than the drum. Use of a conventional clutch is also contemplated. However, if a pin-cage type of clutch is used, there are advantages in driving from the drum to the shoes as shown in FIG. 7.

In FIG. 7, the rate changer components are in the drive mode with two forward speed ratios. In the drive mode, power is initially transferred from the chain case input shaft 16 to the gear 96 and from gear 96 to the sprag clutch input element 116. The power flows from element 116 to the clutch element 120 and to teeth 90 on the output shaft 84. When shaft 114 attains a predetermined rate of rotation, the shoes 134 of the clutch 124 are displaced centrifugally outwardly and engage the drum 126 which is rotating at a higher rate of rotation than the shaft 114 because of the larger radius of gear 136 as compared with the gear 96. Once the shoes 134 engage the drum 126, the rotation of shaft 114 is accelerated. The more rapid rate is transmitted to the chain sprocket 80 by the teeth 122 on the clutch element 120. The clutch element 116 overruns when the centrifugal clutch 124 drives shaft 114.

Movement of the gear 96 to the right of the position shown in FIG. 7 causes engagement of the clutch teeth 92 and 94, resulting in a direct power flow from the shaft 112 to the gear 96, and thence, to the output shaft 84 and the sprocket 80. Movement of the gear 96 to the left of the position shown in FIG. 7 causes disengagement of gear 96 from the teeth on the clutch element 116 to afford a neutral condition or mode without power transfer to the sprocket 80.

RATE CHANGER WITH TWO FORWARD SPEEDS AND REVERSE

Figure 9:
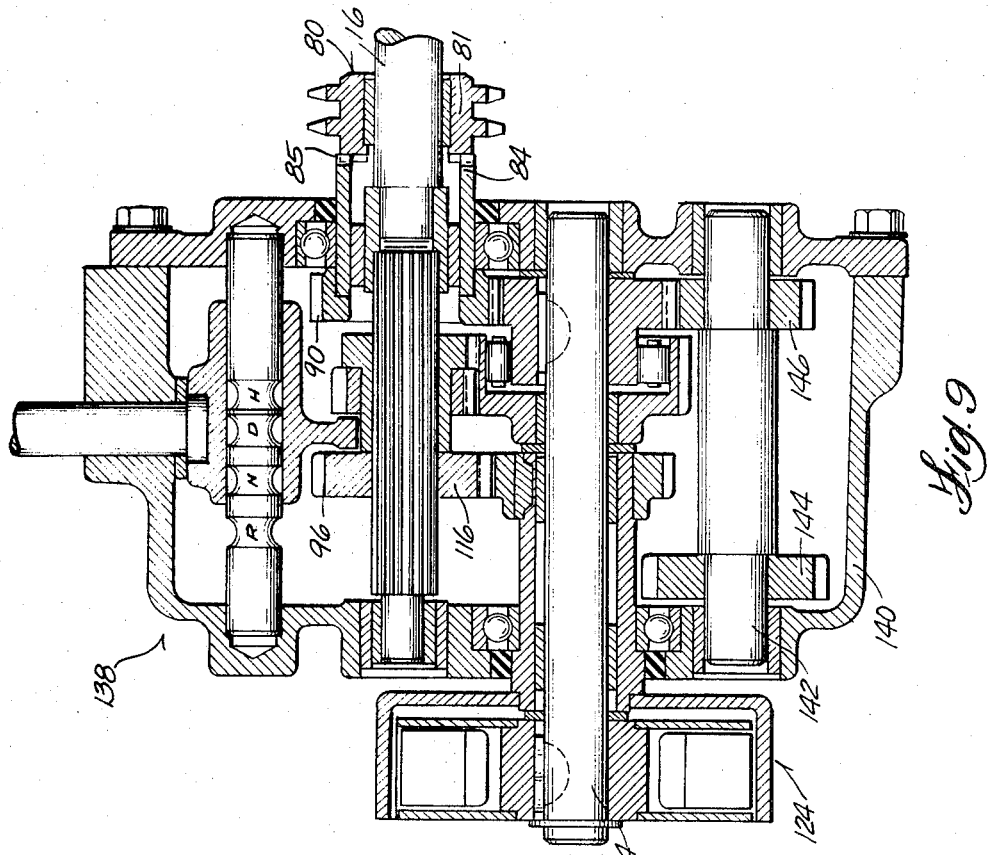
FIG. 9 is a developed sectional view of a rate changer having two forward speed modes with a centrifugal clutch for shifting between the forward speeds and including neutral and reverse modes.

FIG. 9 discloses a further accessory rate changer or transmission 138 which is similar to the transmission 106 and which includes the centrifugal clutch 124 to automatically increase the rate of rotation of the sprocket 80 when the shaft 114 attains a predetermined rate of rotation. The rate changer 138 also includes a reverse mode of operation. In this regard, the housing 140 supports a shaft 142 which has fixed thereto a gear 144 and gear 146. The gear 146 is in continual engagement with the gear teeth 122 on the element 120 of the sprag clutch. When the gear 96 is shifted to the left of the position shown in FIG. 9, it engages the gear 144 to transfer power through gear 146 to clutch element 120 and thence to the teeth 90 on the output shaft 84.

The adaptability of the chain case of the invention resides in the use of a chain sprocket 80 with a hub 81 which is freely supported concentric with the chain case input shaft 16 and in the fact that both the chain case input shaft and the sprocket hub 81 are accessible through the chain case opening 40. Thus, various transmissions such as clutches, reversers, direct devices, or rate changers having concentric input and output shafts co-axial with the chain case input shaft 16 and chain sprocket hub are easily coupled to shaft 16 and sprocket 80 through the opening 40 in the chain case without rebuilding or even altering the original chain and belt drive.

I claim:

1. A chain transfer case having an aperture receiving an input shaft and an opening spaced from said aperture, an input shaft having a free end accessible through said opening, a chain sprocket having a hub concentric with said input shaft and supported for free rotation on said input shaft, said chain sprocket also being accessible through said opening, and a removable closure attached to the case for covering said opening including a transmission unit having a supplementary housing attached to the case, said housing constituting said removable closure and having an opening in registry with said chain case opening.

2. A chain transfer case in accordance with claim 1 wherein said transmission unit includes a driving member concentric with said chain case input shaft.

3. A chain transfer case according to claim 2 wherein said driving member is splined to said end of said input shaft and means for selectively moving said driving member axially on said input shaft to drivingly engage and disengage said driving member with said chain sprocket hub.

4. A chain transfer case according to claim 1 including a transmission unit input shaft coaxial with said chain case input shaft, a coupling connecting said input shafts, and a tubular transmission unit output shaft concentric with said transmission unit input shaft and drivingly engaged through said chain case opening to actuate said chain sprocket hub.

5. A chain transfer case according to claim 4 wherein said input shafts have external splines and said coupling comprises a sleeve having an internal spline which inferfits with said shaft splines and a sleeve bearing located between said coupling and said tubular output shaft.

6. A chain transfer case according to claim 4 wherein said output shaft has axial clutch teeth at one end and driving teeth at the other end, said driving teeth being engaged with said hub of said chain sprocket, and a first gear having a gear hub having clutch teeth engageable with said clutch teeth on said output shaft.

7. A chain transfer case in accordance with claim 6 including a second shaft supported in said transmission unit housing, a second gear supported on said second shaft, a third shaft supported in said transmission unit housing, a third gear on said third shaft in mesh with said second gear, a fourth gear on said third shaft in mesh with said gear teeth on said output shaft and means for shifting said first gear axially on said transmission unit input shaft for selective engagement and disengagement with said clutch teeth on said output shaft and said second gear.

8. A chain transfer case in accordance with claim 6 including a second gear fixed to said transmission unit input shaft, a second shaft rotatably supported in said transmission unit housing, a sprag clutch having an input element with gear teeth in mesh with said first gear and an output element fixed to said second shaft and having gear teeth in mesh with said teeth on said output shaft, and means for automatically changing the rate of rotation of said output shaft, said means including a centrifugal clutch having a drum provided with gear teeth in mesh with said second gear on said transmission input shaft with said centrifugal clutch having a hub fixed to said second shaft, said hub including centrifugally operable shoes yieldably mounted for movement into engagement with said drum at a predetermined rate of rotation so that power is initially transferred from said first gear to said input element of said sprag clutch and from said output element of said sprag clutch to said output shaft and said sprag clutch overrunning when said second shaft is accelerated as said centrifugal clutch hub attains said predetermined rate of rotation.

9. A chain transfer case in accordance with claim 8 including a third shaft having first and second gears with said second gear on said third shaft being in mesh with said teeth on said output element of said sprag clutch and said first gear on said transmission unit input shaft being movable into engagement with said first gear on said second shaft to counter-rotate said output shaft.

10. A chain transfer case having first and second opposed openings, an input shaft extending through said first opening and having a shaft end accessible through said second opening, a chain sprocket having a hub supported within said case on said input shaft, means on said shaft end for drivingly engaging said chain sprocket hub, and a supplementary housing constituting a removable closure for said second opening and secured to said case for enclosing said shaft end and wherein said supplementary housing contains a transmission unit and an opening in registry with said second opening to afford connection of parts of the transmission with said input shaft.

11. A chain transfer case in accordance with claim 10 wherein said hub has an aperture having an internal spline and said means on said shaft end for drivingly engaging said chain sprocket hub comprises an external spline on said shaft end.

12. A chain transfer case in accordance with claim 10 wherein said means on said shaft end drivingly engaging said chain sprocket hub comprises a clutch dog splined to said shaft end and means for selectively moving said clutch dog axially on said input shaft to drivingly engage and disengage said clutch dog with said chain sprocket hub.

13. A chain transfer case in accordance with claim 12 wherein said clutch dog includes an axial aperture and said supplementary housing includes a boss coaxial with said shaft end and projecting into said aperture to support said clutch dog.

14. A chain transfer case in accordance with claim 12 including a rocker arm supported in said housing and a coil spring having legs, one of said legs being anchored in said supplementary housing, the other of said legs being anchored in said rocker arm to shift over center and maintain said clutch dog in the selected position.

15. A chain case in accordance with claim 10 in combination with a transmission input shaft rotatably supported in said supplementary housing and coaxial with said shaft end of said chain case input shaft, a coupling connecting said input shafts, and wherein said means on said shaft end drivingly engaging said chain sprocket hub comprises a tubular transmission output shaft concentric with said input shafts and extending through said second opening in said chain case.

16. A rate changer comprising a housing having a hollow interior, an aperture in said housing adapted to receive the input shaft of a chain transfer case, a first shaft supported in said housing, a first sleeve shaft concentric with said first shaft and having gear teeth and clutch teeth, a first gear movable axially on said first shaft, said first gear including clutch teeth and gear teeth, a second gear on said first shaft, a second shaft, a second sleeve shaft concentric with said second shaft and having gear teeth, a centrifugal clutch providing driving connection between said second shaft and said second sleeve shaft, a sprag clutch on said second shaft having an input element with teeth in mesh with said first gear on said first shaft, a sprag clutch output element fixed to said second shaft and having gear teeth in mesh with said gear teeth on said first sleeve shaft, and means for shifting said first gear axially to afford selective engagement of said clutch teeth on said first gear with said clutch teeth on said first sleeve shaft and said first gear with said input element of said sprag clutch to afford first and second rates of rotation of said first sleeve shaft, said first rate of rotation being provided by power flow from said first gear to said clutch input element and said second rate of rotation being provided when said clutch shoes in said centrifugal clutch engage said clutch drum to transfer power from said second gear on said first shaft to said second shaft.

17. A rate changer according to claim 16 in which the centrifugal clutch comprises a hub with clutch shoes and a clutch drum, said drum being fixed to said second sleeve shaft and said hub being fixed to said second shaft.

18. In combination, a chain transfer case having first and second opposed openings, a chain case input shaft projecting through said openings, a rate changer including a rate changer housing having an opening in registry with said first opening in said chain case, a rate changer input shaft supported in said rate changer housing and coupled to said chain case input shaft, a tubular output shaft concentric with said first shaft and extending from said rate changer housing into said chain transfer case and a chain sprocket supported for free rotation on said chain case input shaft and drivingly engaged with said output shaft.

19. The invention of claim 10 in which said input shaft extends through said second opening, said means on said shaft end for drivingly engaging said chain sprocket hub being movable axially on said input shaft and through said second opening.

20. The invention of claim 19 in which said input shaft has support bearings in said chain transfer case which are wholly at the side of the chain sprocket which is opposite the said means, whereby to leave said input shaft free for axial movement of said means through said opening.

* * * * *